US007623780B2

(12) United States Patent
Takita

(10) Patent No.: US 7,623,780 B2
(45) Date of Patent: Nov. 24, 2009

(54) IMAGE CAPTURING APPARATUS WITH COLOR COMPENSATION

(75) Inventor: Mark Takita, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 360 days.

(21) Appl. No.: 11/378,872

(22) Filed: Mar. 17, 2006

(65) Prior Publication Data

US 2007/0217778 A1  Sep. 20, 2007

(51) Int. Cl.
*G03B 15/03* (2006.01)
(52) U.S. Cl. .......................... 396/155; 396/98
(58) Field of Classification Search ............ 396/98, 396/106, 109, 155; 348/366, 370–371; 356/3, 356/4.07
See application file for complete search history.

(56) References Cited

U.S. PATENT DOCUMENTS

| 5,438,363 | A | 8/1995 | Ejima et al. |
| 7,389,041 | B2 * | 6/2008 | Gindele et al. ............... 396/98 |
| 2004/0041941 | A1 | 3/2004 | Takeshita |
| 2005/0195290 | A1 | 9/2005 | Takeshita |
| 2005/0264685 | A1 | 12/2005 | Hoshuyama |
| 2006/0008171 | A1 * | 1/2006 | Petschnigg et al. .......... 382/254 |

FOREIGN PATENT DOCUMENTS

JP  2004-282460  10/2004

OTHER PUBLICATIONS

The Nikon Guide to Digital Photography with the D2x Digital Camera by Nikon Corporation. The D2x digital camera was released on Feb. 25, 2005.
Model No. GM 5WA06200Z by Sharp—Built-in 3-chip, Super-luminosity Chip LED, as of Apr. 2001.
http://optics.org/aticles/news/10/10/14/1 Dated Dec. 10, 2004, Lamina Ceramics LED array.
Luxeon Flash LXCL-PWF1—Technical Datasheet DS49. Dated Nov. 12, 2004, Lumileds Future Electronics.
Schechner, Yoav Y. et al., Clear Underwater Vision, Israel Ins. Technology, Proceedings of the 2004 IEEE Computer Society Conference on Computer Vision and Pattern Recognition (CVPR'04) 1063-6919/ 04, Copyright 2004 IEEE.

* cited by examiner

*Primary Examiner*—Bot L LeDynh

(57) ABSTRACT

An image capturing apparatus (10) for providing an adjusted image (214) of a scene (12) includes an apparatus frame (222), a flash system (230), a capturing system (226), and a control system (232). The flash system (230) generates a flash of light (248) to illuminate the scene (12). The capturing system (226) captures an original image (368) when the scene (12) is illuminated and a non-flash image (366) when the scene (12) is not illuminated. The original image (368) has an original color composition (368A) and the non-flash image (366) has a non-flash color composition (366A) that is different than the original color composition (368A). The control system (232) evaluates the non-flash image (366) and the original image (368). In one embodiment, the control system (232) provides the adjusted image (214) that is based on the non-flash image (366) and the original image (368). A selected color composition (470) can be input into the control system (232) to adjust the color composition of the adjusted image (214).

12 Claims, 6 Drawing Sheets

IMAGE CAPTURING APPARATUS WITH COLOR COMPENSATION

BACKGROUND

Cameras are commonly used to capture an image of a scene. A typical camera includes a camera flash that emits a consistent, white light that illuminates the subject of the image. Quite often, the scene is already illuminated by off-white light sources that provide a special atmosphere or mood for the scene. For example, at night, the scene can be illuminated by one or more candles that emit colors other than "true" white light. The candles can provide a romantic ambiance to the scene. Alternatively, for example, the scene may be lit by artificial light sources which contain unusual colors to create another type of atmosphere or mood, such as those used in stage lighting. Unfortunately, in certain designs, existing cameras are not able to accurately capture the special atmosphere or mood of the scene.

SUMMARY

The present invention is directed to an image capturing apparatus for capturing an image of a scene. The image capturing apparatus includes an apparatus frame, a flash system, a capturing system, and a control system. The flash system generates a flash of light to illuminate the scene. The capturing system captures an original image when the scene is illuminated by the flash and a non-flash image when the scene is not illuminated. The original image has an original color composition and the non-flash image has a non-flash color composition that is different than the original color composition. In one embodiment, the control system generates an adjusted image that is based on the non-flash image and the original image.

As provided herein, the adjusted image can be based on the original image that is altered or adjusted by the control system to include at least a portion of the non-flash color composition of the non-flash image. For example, the adjusted image can be based on the original image that adjusted in view of the non-flash color composition.

In one embodiment, the scene is illuminated by light from a light source that contributes to a scene color composition of the scene. Because the non-flash image is captured without the flash of light from the flash system, the non-flash image captures the scene color composition. More specifically, the non-flash color composition closely resembles the scene color composition. With this design, the control system can provide an adjusted imaged that is based on the original image which is adjusted to include the non-flash color composition, e.g. the predominant colors of light, captured in the non-flash image. For example, the adjusted image can have an adjusted color composition that is significantly biased towards the non-flash color composition. Stated in another fashion, the adjusted image is based on the original image that is adjusted so that the adjusted image has an image color composition that is significantly biased towards the non-flash color composition.

Additionally, or alternatively, the image capturing apparatus can include a selector that can be selectively controlled by a user of the image capturing apparatus. In this embodiment, the selector can be selectively controlled by the user to selectively choose a selected color composition. With this design, the control system generates an adjusted image that is based on the original image that is adjusted to include at least a portion of the selected color composition. Non-exclusive examples of potential color compositions include candlelight, fire, moonlight, stage light, sunset, and/or fireworks.

With the designs provided herein, in certain embodiments, the adjusted image generated by the control system more accurately captures the actual scene color composition of the scene and/or better creates the desired atmosphere or mood for the adjusted image.

The present invention is also directed to a method for creating an image of a scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
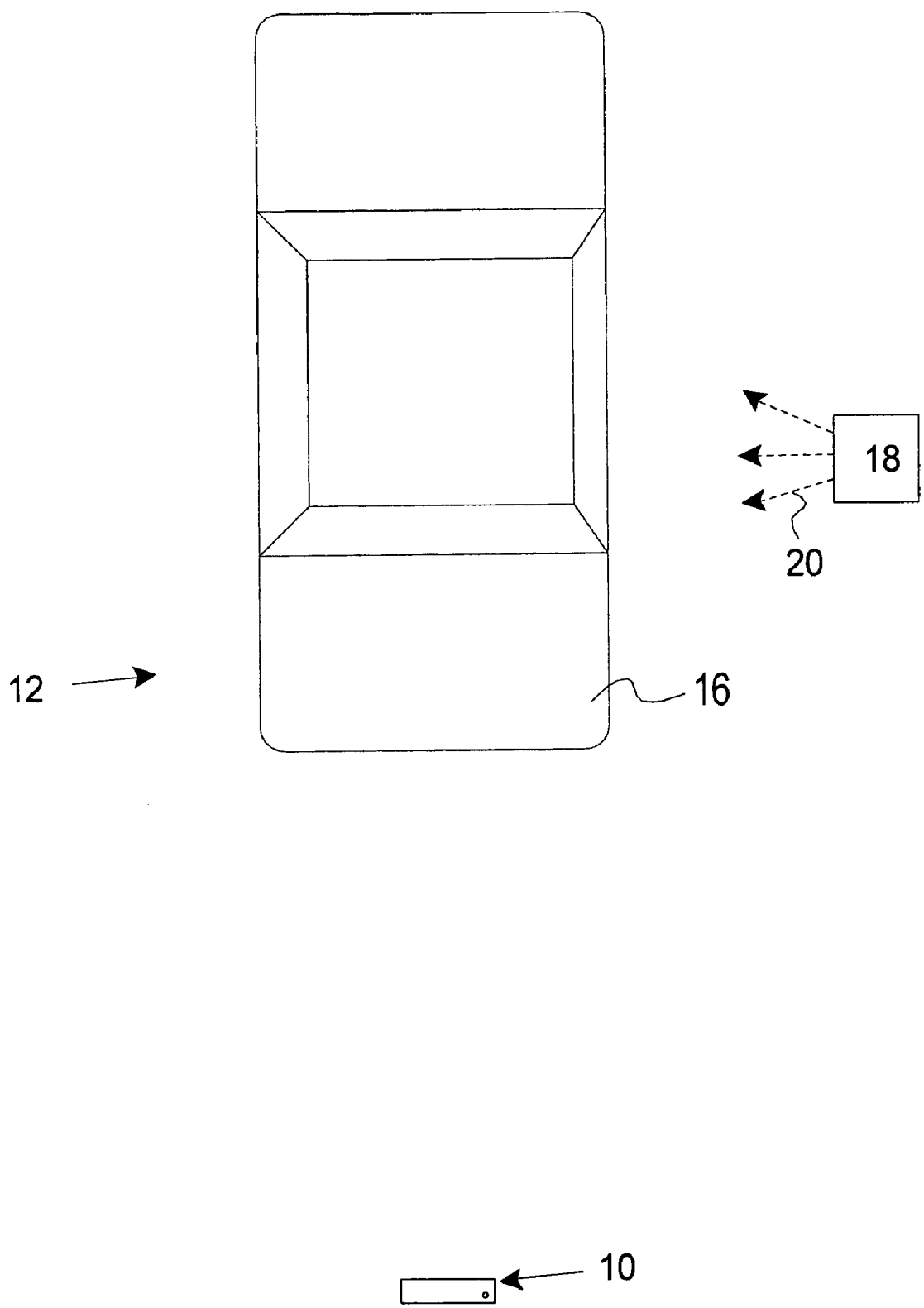
FIG. 1 is a simplified top plan view of a scene and an image capturing apparatus having features of the present invention.

FIG. 1 is a simplified top plan illustration of an image capturing apparatus 10 having features of the present invention and a scene 12. The image capturing apparatus 10 is useful for providing an adjusted image 214 (illustrated in FIG. 2B) of the scene 12. The type of scene 12 captured by the image capturing apparatus 10 can vary. For example, the scene 12 can include one or more people, animals, items, objects, and/or environments. In FIG. 1, the scene 12 includes a car 16.

Further, in FIG. 1, the scene 12 is at least partly illuminated by a light source 18 that can cooperate with other light sources (not shown) to create a scene lighting condition for the scene 12. In one embodiment, the light source 18 generates light 20 (illustrated as arrows) that include colors other than white (e.g. red, blue, and green) which creates atmosphere or mood for the scene 12. For example, the light source 18 can be an electric light source, e.g. a stage light that generates light 20 that includes red, blue and/or green. With this design, the stage light creates a first scene color composition for the scene 12.

Alternatively, for example, the light source 18 can be a candle that creates a second scene color composition for the scene 12, a lantern that creates a third scene color composition for the scene 12, or a campfire that creates a fourth scene color composition for the scene 12. Still alternatively, the scene 12 can be illuminated by natural sources of light that create atmosphere or mood for the scene 12, such as the sun near sunset that creates a fifth scene color composition for the scene 12, and/or sunlight reflected off of the moon that creates a sixth scene color composition for the scene 12. It should be noted that the light sources and the lighting conditions provided herein are merely non-exclusive examples of possible light sources and scene color composition.

In certain embodiments, the image capturing apparatus 10 can be any device capable of capturing electronically capturing an image, including (i) a digital camera that electronically stores the image, (ii) a digital camera in video mode, and/or (iii) a video recording device that electronically records still or moving images. As provided herein, in certain embodiments, the image capturing apparatus 10 is better adapted to capture the atmosphere or mood of the scene 12.

Figure 2A:
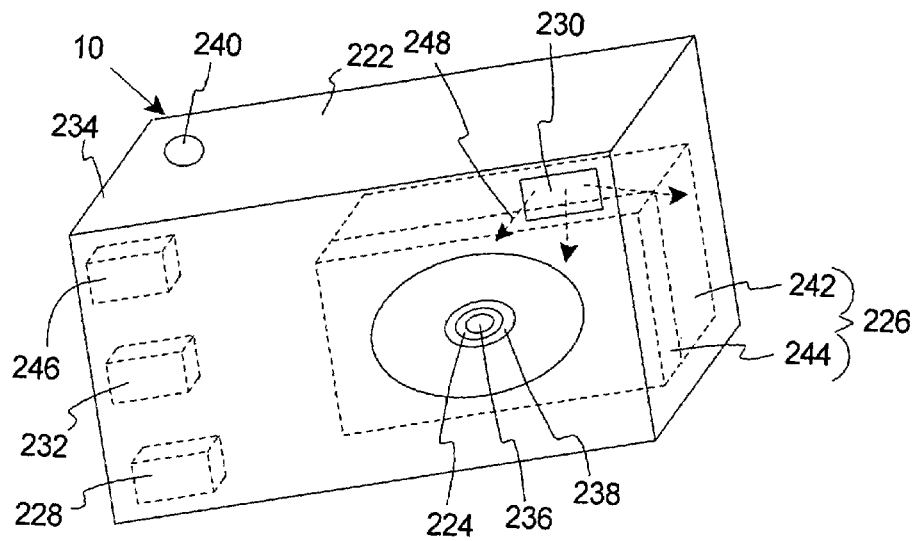
FIG. 2A is a simplified front perspective view of one embodiment of the image capturing apparatus.

FIG. 2A illustrates a simplified, front perspective view of one, non-exclusive embodiment of the image capturing apparatus 10. In this embodiment, the image capturing apparatus 10 is a camera that includes an apparatus frame 222, an optical assembly 224, a capturing system 226 (illustrated as a box in phantom), a power source 228 (illustrated as a box in phantom), a flash system 230, and a control system 232 (illustrated as a box in phantom). The design of these components can be varied to suit the design requirements and type of image capturing apparatus 10.

The apparatus frame 222 can be rigid and support at least some of the other components of the image capturing apparatus 10. In one embodiment, the apparatus frame 222 includes a generally rectangular shaped hollow body 234 that forms a cavity that receives and retains at least a portion of the capturing system 226.

Additionally, the apparatus frame 222 can include an aperture 236 and a shutter mechanism 238 that work together to control the amount of light that reaches the capturing system 226. For example, the aperture 236 is a substantially circular opening in the front of the body 234 that helps to control the amount of light that reaches the capturing system 226. The beams of light that bounced off the object(s) of the scene 12 (illustrated in FIG. 1) can be directed into the body 234 through the aperture 236. To increase the amount of light that ultimately gets focused on the capturing system 226 the size of the aperture 236 can be increased. Conversely, to decrease the amount of light that gets focused on the capturing system 226 the size of the aperture 236 can be decreased.

The shutter mechanism 238 can include a pair of shutter blades (sometimes referred to a "shades") positioned between the optical assembly 224 and the capturing system 226 and a shutter button 240 that activates the shutter blades. The shutter blades work in conjunction with each other to allow the light to be focused on the capturing system 226 for a certain amount of time. Before capturing an image 214, the first shutter blade is closed so no light will be focused on the image capturing system 226. When the shutter button 240 is pressed, the first shutter blade slides open to allow light to be focused on the capturing system 226. After a certain preset amount of time, the second shutter blade slides closed so as to prevent further light from being focused on the capturing system 226.

The amount of time that the shutter mechanism 238 permits the light to pass through the aperture 236 is commonly referred to as the shutter speed. A slow shutter speed means that the shutter mechanism 238 is open for a relatively long period of time, thereby allowing a greater amount of light to be captured and ultimately focused on the capturing system 226. Slow shutter speeds are commonly used when the amount of light available outside the body of the camera is relatively low. Conversely, a fast shutter speed means that the shutter mechanism 238 is open for a relatively short period of time, thereby allowing less light to be captured and ultimately focused on the capturing system 226. Fast shutter speeds are commonly used to minimize the effect of movement of the object(s) in the scene 12.

The optical assembly 224 is secured to the body 234 near the aperture 236. The optical assembly 224 can include a single lens or a combination of lenses that work in conjunction with each other to focus light onto the capturing system 226. The optical assembly 224 focuses the light that passes through the aperture 236 onto the capturing system 226.

The distance between the optical assembly 224 and the capturing system 226, commonly referred to as the focal length, can be adjusted to control how much light is ultimately focused on the capturing system 226. As the focal length decreases, the corresponding image 214 that is created at the capturing system 226 gets smaller. Conversely, as the focal length increases, the magnification of the image 214 also increases and the object(s) being captured appear to get closer.

The capturing system 226 is controlled by the control system 232 to capture an original image (not shown in FIG. 2A) when the scene 12 is illuminated by the flash system 230, and a non-flash image (not shown in FIG. 2A) when the scene 12 is not illuminated by the flash system 230. The original image has an original color composition. Further, the non-flash image has a non-flash color composition that is different than the original color composition.

The amount of time between when the capturing system 226 captures the original image and the non-flash image can vary. For example, the non-flash image can be captured immediately prior or immediately after the original image is captured. In non-exclusive examples, the time between when the capturing system 226 captures the original image and the non-flash image can be less than approximately $1/30^{th}$, $1/40^{th}$, $1/50^{th}$, $1/60^{th}$, $1/70^{th}$, or $1/80^{th}$ of a second.

It should be noted that in certain embodiments, the non-flash image can be captured at relatively low speeds to give the capturing system 226 more light. This can result in the non-flash image being blurred. However, in certain embodiments, the captured image will use the image from the original image and just the color from the non-flash image, essentially.

The amount of resolution of the original image and the non-flash image can vary. For example, the non-flash image can have approximately the same resolution as the original image. Alternatively, the non-flash image can have a higher resolution or lower resolution than the original image.

In one embodiment, capturing system 226 is positioned within the apparatus frame 222, and is coupled to the apparatus frame 222. The design of the capturing system 226 can vary according to the type of image capturing apparatus 10. For a digital type camera, the capturing system 226 includes an image sensor 242, a filter assembly 244, and a storage system 246.

The image sensor 242 receives the light that passes through the aperture 236 and converts the light into electricity. The type of image sensor 242 can vary. One non-exclusive example of an image sensor 242 for digital cameras is known as a charge coupled device ("CCD"). A CCD consists of an integrated circuit containing an array of tiny, light-sensitive photosites or pixels, which are capable of accumulating varying amounts of charge in proportion to the amount of light they receive. A CCD can contain thousands or even millions of these photosites, each of which is individually light-sensitive.

When the beams of light strike the surface of the CCD, it frees up electrons to move around, and the CCD reads the accumulated charge that is produced at each photosite. The CCD, because the accumulated charge at each photosite is read in analog form, further employs the use of an analog-to-digital converter, or ADC, which converts the value of the accumulated charge at each photosite into a digital value. The overall effect of the operation of the CCD and ADC is the formation of a digital grayscale image that corresponds to how much light has fallen on each photosite. The amount of detail that is captured within such an image formed through use of a CCD is referred to as resolution, and resolution is measured by the number of photosites or pixels on the surface of the CCD. By way of example, a CCD which contains an array of one million photosites is referred to as having 1.0 megapixels. The more photosites present within the CCD, the more detail the camera can capture and the larger pictures can be printed without becoming blurry.

An alternative image sensor 242 that may be employed in digital cameras uses complementary metal oxide semiconductor ("CMOS") technology. CMOS devices use several transistors at each photosite to amplify and move the charge using more traditional wires.

As noted above, the image sensor 242, by itself, produces a grayscale image as it only keeps track of the total intensity of the light that strikes the surface of the image sensor 242. Accordingly, in order to produce a full color image, the filter assembly 244 (illustrated as a box in phantom) is necessary to recreate the image 214 with its true colors. The filter assembly 244 is able to recreate the true colors of the image 214 by focusing on and capturing the three primary colors, red, blue and green.

The filter assembly 244 can be positioned directly in front of the image sensor 242. While there are several methods for capturing the three primary colors in a digital camera, the most common filter assembly 244 used in digital cameras is a bayer filter or bayer mask. A bayer filter has an essentially checkerboard pattern that alternates between rows of red and green filters with rows of blue and green filters. By placing the bayer filter directly in front of the image sensor 242, each square of four pixels has one filtered red, one filtered blue, and two filtered green (as the human eye is more sensitive to green than either red or blue). The unconverted output from the image sensor 242 employing a bayer filter is a mosaic of green, red and blue photosites of different intensities. The camera then uses specialized algorithms to convert this mosaic into a mosaic that exhibits the true colors as captured from the object(s) being photographed.

It should be noted that other designs for the capturing system 226 can be utilized.

It should also be noted, as discussed in more detail below, that with information from the capturing system 226, the control system 232 can determine the predominant colors of the scene color composition of the scene 12 before the scene 12 is illuminated by the flash system 230. With this information, the control system 232 can generate the adjusted image 214 that better captures the actual scene color composition.

The storage system 246 stores the various images 214 before the images 214 are ultimately printed out, deleted, transferred or downloaded to another system (not shown), such as a computer, an auxiliary storage system or a printer. The storage system 246 can be fixedly or removable coupled to the apparatus frame 222. Non-exclusive examples of suitable storage systems 246 include flash memory, a floppy disk, a hard disk, or a writeable CD or DVD. Further, the amount of storage space within the storage system 246 can vary greatly depending upon the specific storage system 246 chosen.

The power source 228 provides electrical power to the electrical components of the image capturing apparatus 10. For example, the power source 228 can include one or more chemical batteries, either the one time use disposable batteries (such as alkaline, zinc-air), or the multiple use rechargeable batteries (such as nickel-cadmium, nickel-metal-hydride, lead-acid, lithium-ion).

Often times images 214 are taken in an atmosphere where sufficient natural or artificial light is present so as to enable the production of a high quality and easily discernible image. However, other times images 214 are taken in an atmosphere which provides limited amounts of lighting where the flash system 230 may be required. If needed, the flash system 230 can provide a generated flash of light 248 that can be used to illuminate at least a portion of the scene 12.

The design of the flash system 230 can vary according to the teachings provided herein. In one embodiment, the flash system 230 can generate a flash of light 248 having a consistent, white generated light beam that illuminates the scene 12. For example, the flash system 230 can include a xenon filled flash bulb that emits a consistent white light when activated.

The flash system 230 can be coupled to the apparatus frame 222. For example, the flash system 230 can be fixedly mounted to the apparatus frame 222, positioned at least partly within the apparatus frame 222, removably affixed to the apparatus frame 222 and/or usable spaced apart from the apparatus frame 222.

The control system 232 is electrically connected to and controls the operation of the electrical components of the image capturing apparatus 10. For example, the control system 232 is electrically connected to the flash system 230 and controls the operation of the flash system 230 to precisely control the timing of the flash of light 248. More specifically, the control system 232 can direct power to the flash system 230 to produce the flash of light 248 substantially simultaneously as the original image is being captured.

Further, in certain embodiments, the control system 232 precisely controls the other components to control the timing of the capture of the original image and the non-flash image. The control system 24 can include one or more processors and circuits.

Additionally, the control system 232 can adjust the color content of the original image to produce the adjusted image 214 that better captures and/or recreates the appropriate or desired atmosphere, setting or mood from the scene 12.

In one embodiment, the control system 232 evaluates the non-flash image and the original image. Further, the control system 232 provides the adjusted image 214 that is based on the non-flash image and the original image. For example, the adjusted image 214 can be based on the original image that is altered to include at least a portion of the non-flash color composition of the non-flash image. Stated in another fashion, the adjusted image 214 is based on the original image that adjusted in view of the non-flash color composition of the non-flash image.

In one embodiment, the adjusted image 214 has an adjusted color composition that is significantly biased towards the non-flash color composition. Stated in another fashion, the adjusted image 214 is based on the original image that adjusted so that the adjusted image 214 has the adjusted color composition that is significantly biased towards the non-flash color composition.

With this design, the adjusted image 214 is significantly biased towards the measured color of the non-flash image and the fill color of the white flash from the original image is overridden.

Stated in another fashion, with information regarding the color content of the scene 12 without the flash of light 248 from the flash system 230, the control system 232 adjusts the original image to mimic one or more of the measured colors of the scene 12 and causes the adjusted image 214 to be filled with the same colors or other colors that may enhance the adjusted image 214. For example, in one embodiment, the control system 232 can adjust the tonal values of red, green, and blue in the original image to mimic one or more of the tonal values of red, green, and blue from the scene 12 without the flash of light 248.

In this embodiment, the control system 232 can include a compensation mode and a non-compensation mode and a user can select between these two modes. For example, in the compensation mode, the control system 232 causes the capturing system 226 to capture the original image and the non-flash image and subsequently, the control system 232 generates the adjusted image 214. Further, in the non-compensation mode, the control system 232 provides the original image without any adjustment. With this design, the user can select between these two modes. Alternatively, the control system 232 can be designed to evaluate the scene 12, determine if compensation to the image would be beneficial, and subsequently activate the image compensation.

In one embodiment, the control system 232 is coupled to the apparatus frame 222 and is positioned within the apparatus frame 222.

Figure 2B:
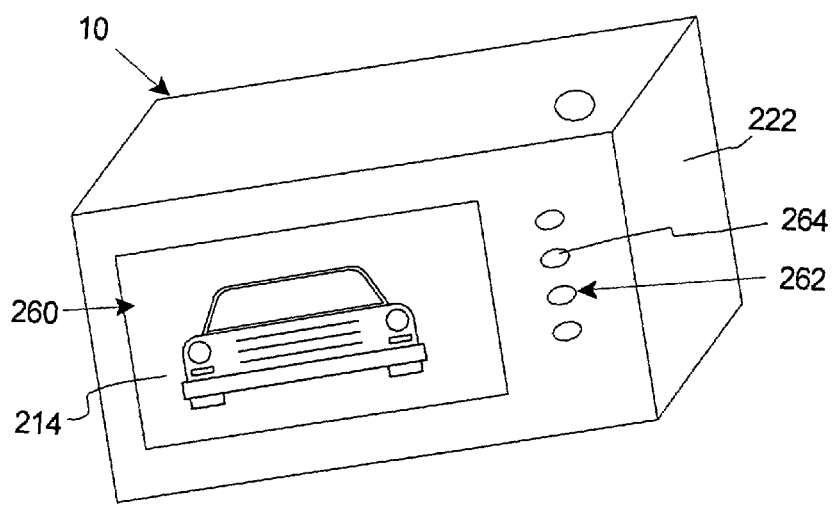
FIG. 2B is a simplified rear perspective view of the image capturing apparatus of FIG. 2A.

Referring to FIG. 2B, additionally, the image capturing apparatus 10 can include an image display 260 that displays the adjusted image 214. With this design, the user can decide which images 214 should be stored in the storage system 246 and which images 214 should be deleted. For example, the image display 260 can be fixedly mounted to the apparatus frame 222 on the back side. Alternatively, the image display 260 can be secured to the apparatus frame 222 with a hinge mounting system (not shown) that enables the display to be pivoted away from the apparatus frame 222. One non-exclusive example of an image display includes an LCD screen.

Moreover, the image capturing apparatus 10 can include one or more control switches 262 electrically connected to the control system 232 (illustrated in FIG. 2A) that allow user to control the functions of the image capturing apparatus 10. For example, the control switches 262 can be used to turn on and off the apparatus 10, delete images 214, focus the image 214, and many other functions.

Additionally, one or more of the control switches 262 can be a selector 264 that allows the user to select between the compensation mode and the non-compensation mode described above.

Figure 3A:
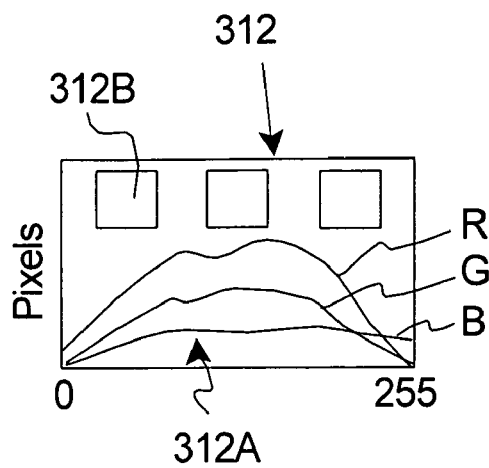
FIG. 3A illustrates one embodiment of a scene.

FIG. 3A illustrates one, non-exclusive example of a scene 312 having a scene color composition 312A and a plurality of objects 312B. The scene color composition 312A is represented with a simplified illustration of a RGB histogram. In the RGB histograms illustrated herein, line designated "R" represents red, line designated "G" represents green, line designated "B" represents blue, and the level of R, G, and B is expressed as a number between 0 and 255. The vertical axis is the relative number of pixels that have each value of R, G, B. For example, the higher the position of the curve, the higher number of pixels that have that particular value of R, G, B. The objects 312B are represented as square boxes. For example, the type of object 312B represented in the scene 312 can be one or more people, animals, items, objects, and/or environments.

In FIG. 3A, the scene color composition 312A is dominated by the color Red. The scene color composition 312A can be partly or fully caused by one or more separate light sources 18 (illustrated in FIG. 1). In non-exclusive examples, the scene color composition 312A can be caused by one or more stage lights, fireworks, candles, lanterns, or a campfire. Still alternatively, the scene color composition 312A can be caused the sun near sunset, and/or sunlight reflected off of the moon. It should be noted that the light sources 18 and the scene color composition 312A provided herein is merely a non-exclusive example of possible light sources 18 and a possible scene color composition 312A.

Figure 3B:
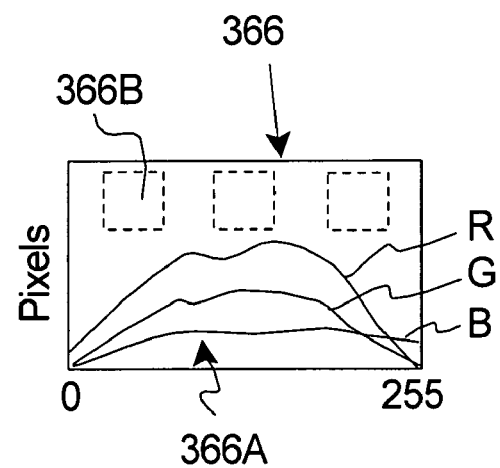
FIG. 3B illustrates a non-flash image of the scene of FIG. 3A.

FIG. 3B illustrates a non-flash image 366 of the scene 312 (illustrated in FIG. 3A) that is captured by the image capturing apparatus 10 (not shown in FIG. 3B) without the use of the flash of light 248 (illustrated in FIG. 2A). As illustrated in FIG. 3B, the non-flash image 366 has a non-flash color composition 366A that is represented with a simplified illustration of a RGB histogram. Because no flash of light 248 was used for the non-flash image 366, the image capturing apparatus 10 accurately captures the colors that currently exist in the scene 12 as a result of the one or more separate light sources 18 and the non-flash color composition 366A closely represents the scene color composition 312. Thus, the non-flash color composition 366A is again dominated by the color red.

Moreover, the non-flash image 366 has captured the objects 312B (illustrated in FIG. 3A) from the scene 312 as non-flash objects 366B. However, in FIG. 3B, the non-flash objects 366B are represented as dashed squares. This is because without the flash of light 248, the scene 312 is not sufficiently illuminated to clearly capture the image of the objects 312B. Stated in another fashion, without the flash of light 248, the image capturing apparatus 10 does not clearly capture the objects 312B of the scene 312. As a result thereof, the non-flash objects 312B are illustrated in FIG. 3B with dashed lines.

Figure 3C:
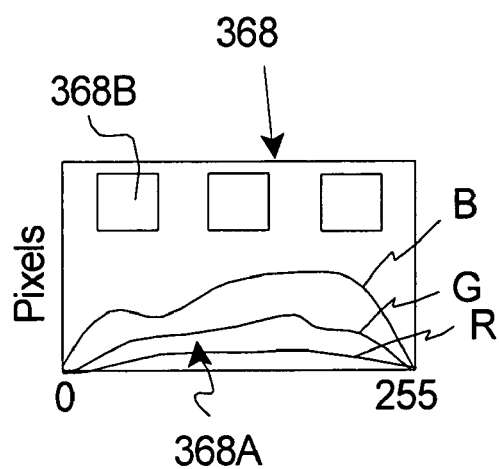
FIG. 3C illustrates an original image of the scene of FIG. 3A.

FIG. 3C illustrates an original image 368 of the scene 312 (illustrated in FIG. 3A) that is captured by the image capturing apparatus 10 (not shown in FIG. 3C) with the use of the flash of light 248 (illustrated in FIG. 2A). As illustrated in FIG. 3C, the original image 368 has an original color composition 368A that is represented with a simplified illustration of a RGB histogram. In FIG. 3C, the image capturing apparatus 10 does not accurately capture the original colors that exist in the scene 12 as a result of the one or more separate light sources 18 and the original color composition 368A does not closely represent the scene color composition 312A (illustrated in FIG. 3A). Instead, the original color composition 368A is dominated by the color blue. This illustrates that the flash of light 248 has caused the original colors of the scene 312 to be filled with the white flash. As a result thereof, the colors of the scene color composition 312A are not accurately captured with the original image 368.

Moreover, the original image 368 has captured the objects 312B (illustrated in FIG. 3A) from the scene 312 as original objects 368B. In FIG. 3C, the original objects 368B are represented as solid line squares. This is because with the flash of light 248, the scene 312 is sufficiently illuminated to clearly capture the image of the objects 312B. Stated in another fashion, with the flash of light 248, the image capturing apparatus 10 is able to clearly capture the objects 312B of the scene 312. As a result thereof, the original objects 368B are illustrated in FIG. 3C with solid lines.

Figure 3D:
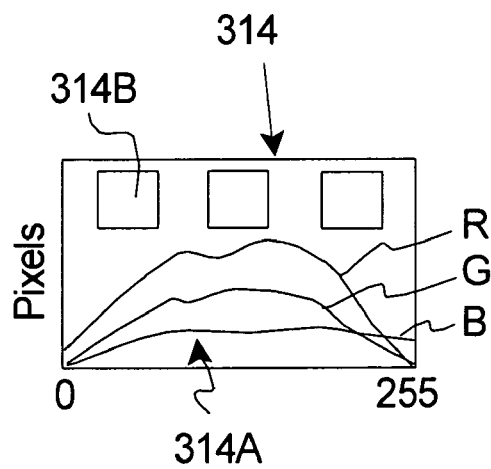
FIG. 3D illustrates an adjusted image of the scene of FIG. 3A.

FIG. 3D illustrates the resulting adjusted image 314 of the scene 312 (illustrated in FIG. 3A) that is provided by the image capturing apparatus 10 (not shown in FIG. 3C). As illustrated in FIG. 3D, the adjusted image 314 has an adjusted color composition 314A that is represented with a simplified illustration of a RGB histogram. In FIG. 3D, the adjusted image 314 accurately represents the original colors in the scene 312 as represented by the adjusted color composition 314A that closely resembles the scene color composition 312A (illustrated in FIG. 3A).

Moreover, the adjusted image 314 clearly represents the objects 312B (illustrated in FIG. 3A) from the scene 312 as adjusted objects 314B. In FIG. 3D, the adjusted objects 314B are represented as solid line squares because they are clearly visible in the adjusted image 314.

As described earlier, the control system 232 (illustrated in FIG. 2A) generates the adjusted image 314 that is based on the original image 368 (illustrated in FIG. 3C) that is altered to include at least a portion of the non-flash color composition 366A (illustrated in FIG. 3B) of the non-flash image 366 (illustrated in FIG. 3B). Stated in another fashion, the adjusted image 214 utilizes the original objects 368B (illustrated in FIG. 3C) captured in the original image 368 and the non-flash color composition 366A from the non-flash image 366.

As a result thereof, in certain embodiments, the adjusted image 314 clearly illustrates the objects 312B from the scene 312 and more closely illustrates the scene color composition 312A.

Figure 4:
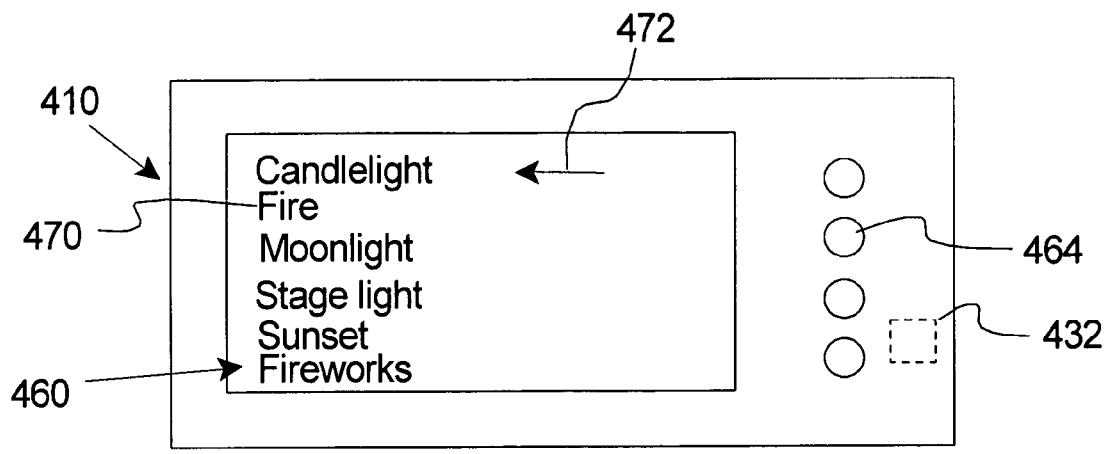
FIG. 4 is a rear view of one embodiment of the image capturing apparatus.

FIG. 4 illustrates a rear view of yet another embodiment of the image capturing apparatus 410 having features of the present invention that includes a manual compensation mode. More specifically, FIG. 4 illustrates that the image display 460 can also display a number of different potential selected color compositions 470 that the scene 12 (illustrated in FIG. 1) may have or that the user may desire that the adjusted image (not shown in FIG. 4) have. With this design, the user can evaluate the scene 12 and use the selector 464 to move a cursor 472 to select one of the potential selected color compositions 470 that best matches the scene 12. Alternatively, the user can use the selector 464 to select one of the potential color compositions 470 to create the desired atmosphere or mood for the adjusted image. The selection is relayed to the control system 432 which subsequently adjusts the image according to the selection.

With this design, the image capturing apparatus 410 can provide the adjusted image that more closely resembles the lighting, setting, or mood of the scene 12.

Non-exclusive examples of potential selected color compositions 470 include candlelight, fire, moonlight, stage light, sunset, and fireworks. With the selected color composition 470, the control system 432 can inject colors that simulate that particular selected color composition 470. For example, if candlelight is selected, the control system 432 can inject colors consistent with candlelight into the original image to generate the adjusted image. Similarly, if fire is selected, the control system 432 can inject colors consistent with fire into the original image to generate the adjusted image. The other color compositions 460 can function in a similar fashion.

Figures 5A, 5B:
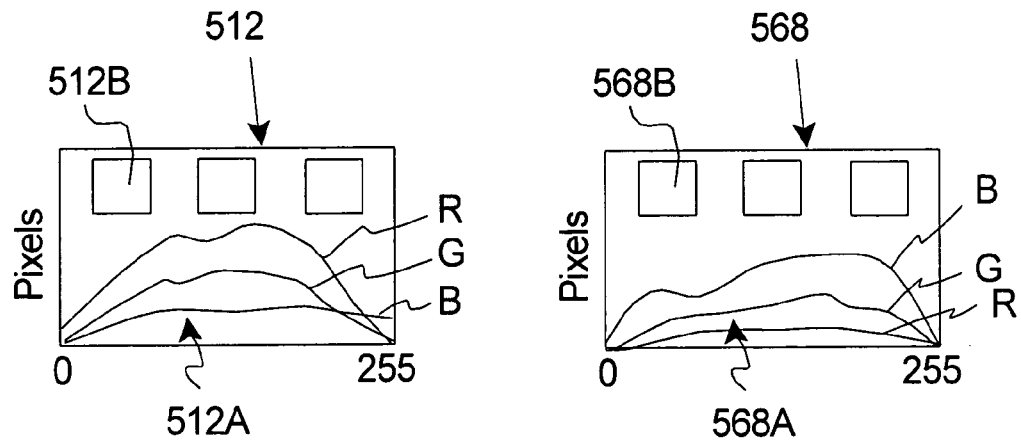
FIG. 5A illustrates another embodiment of a scene.
FIG. 5B illustrates an original image of the scene of FIG. 5A.

FIG. 5A illustrates another, non-exclusive example of a scene 512 having a scene color composition 512A and a plurality of objects 512B. The scene color composition 512A that is represented with a simplified illustration of a RGB histogram. The objects 512B are represented as square boxes.

In FIG. 5A, the scene color composition 512A is again dominated by the color Red. The scene color composition 512A can be partly or fully caused by one or more separate light sources 18 (illustrated in FIG. 1).

FIG. 5B illustrates an original image 568 of the scene 512 (illustrated in FIG. 5A) that is captured by the image capturing apparatus 10 (not shown in FIG. 5B) with the use of the flash of light 248 (illustrated in FIG. 2A). As illustrated in FIG. 5B, the original image 568 has an original color composition 568A that is represented with a simplified illustration of a RGB histogram.

In FIG. 5B, the image capturing apparatus 10 does not accurately capture the original colors in the scene 512 that exist as a result of the separate light sources 18 and the original color composition 568A does not closely represent the scene color composition 512A (illustrated in FIG. 5A). Instead, the original color composition 568A is dominated by the color blue. This illustrates that the flash of light 548 has caused the colors of the scene 512 to be filled with the white flash. As a result thereof, the colors of the scene color composition 512A are not accurately captured with the original image 568.

Moreover, the original image 568 has captured the objects 512B (illustrated in FIG. 5A) from the scene 512 as original objects 568B. In FIG. 5B, the original objects 568B are represented as solid line squares. This is because with the flash of light 548, the scene 512 is sufficiently illuminated to clearly capture the image of the objects 512B.

Figure 5C:
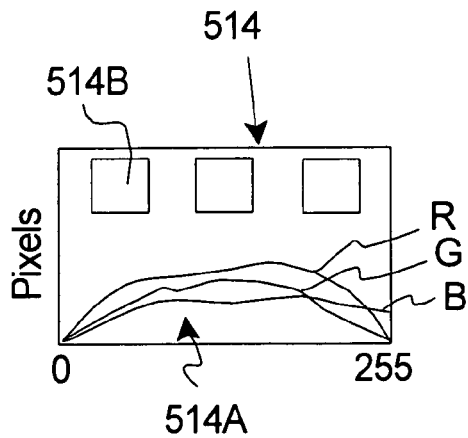
FIG. 5C illustrates an adjusted image of the scene of FIG. 5A.

FIG. 5C illustrates the resulting adjusted image 514 of the scene 512 (illustrated in FIG. 5A) that is provided by the image capturing apparatus 10 (not shown in FIG. 5C). As illustrated in FIG. 5C, the adjusted image 514 has an adjusted color composition 514A that is represented with a simplified illustration of a RGB histogram. In FIG. 5C, the adjusted image 514 more closely represents the colors in the scene 512 as represented by the adjusted color composition 514A that closely resembles the scene color composition 512A (illustrated in FIG. 5A).

Moreover, the adjusted image 514 clearly represents the objects 512B (illustrated in FIG. 5A) from the scene 512 as adjusted objects 514B. In FIG. 5C, the adjusted objects 514B are represented as solid line squares because they are clearly visible in the adjusted image 514.

As described earlier, in this embodiment, the control system 432 (illustrated in FIG. 4) generates the adjusted image 514 that is based on the original image 568 (illustrated in FIG. 5B) that is altered in view of the selected color composition 470 (illustrated in FIG. 4).

As a result thereof, in certain embodiments, the adjusted image 514 clearly illustrates the objects 512B from the scene 512 and more closely illustrates the scene color composition 512A.

Figure 6A:
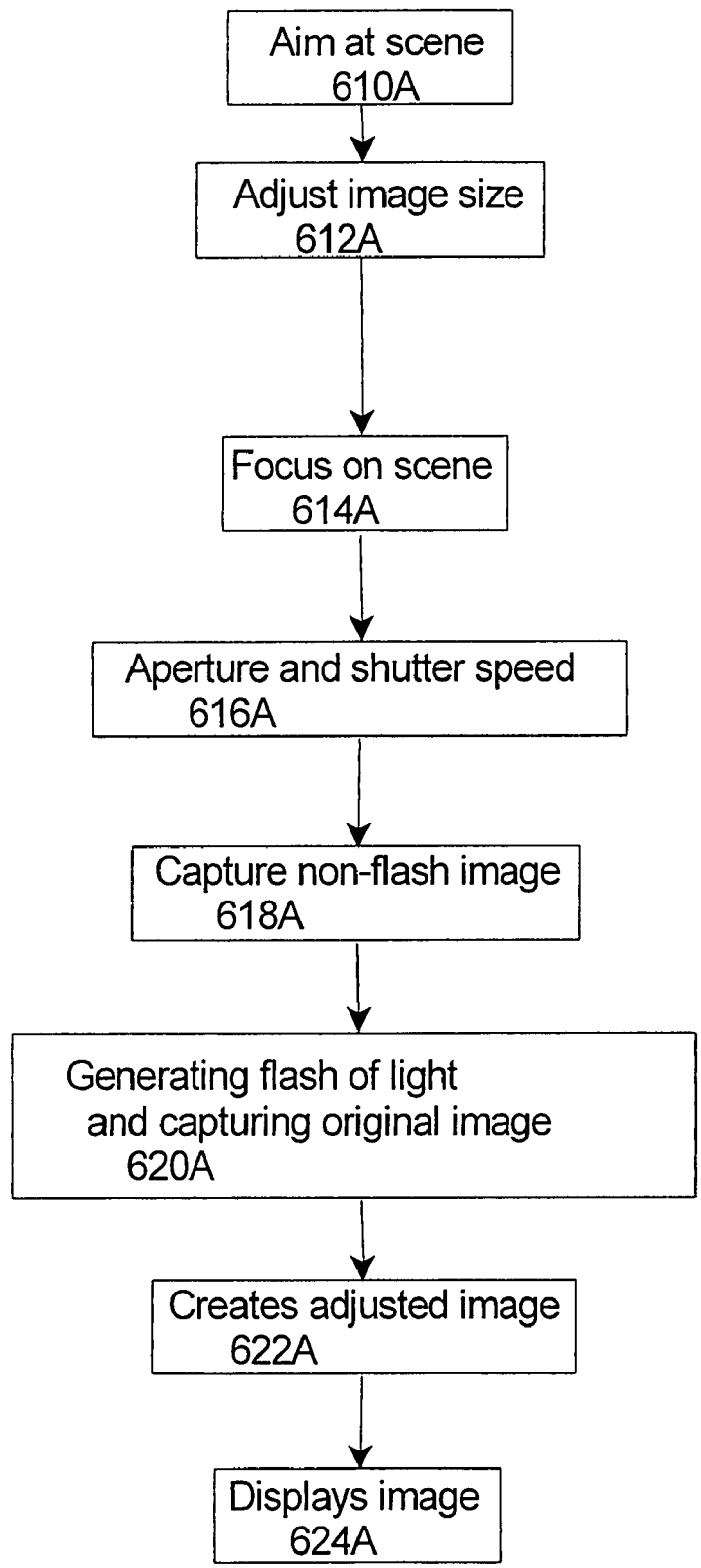
FIG. 6A is a simplified flowchart that illustrates one example of the operation of the image capturing apparatus.

FIG. 6A is a simplified flowchart that illustrates one non-exclusive example of the operation of the image capturing apparatus. First, the image capturing apparatus is aimed toward the scene 610A. Second, the user adjusts the zoom so as to adjust the size of the image as desired 612A. Next, the user presses lightly on the shutter button to enable the image capturing apparatus to automatically focus on the object(s) and monitor the available light 614A. Subsequently, the image capturing apparatus sets the aperture and shutter speed 616A. Next, if the image capturing apparatus is in the automatic compensation mode, the control system causes the capturing system to capture the non-flash image 618A. The capturing system continues to capture subsequent non-flash images until the shutter button is fully pressed and the last image captured prior to fully depressing the shutter button is used as the non-flash image 619A. During this time, the most recent non-flash image is stored and the previous non-flash image is deleted 621A. Subsequently, the user presses the shutter button all the way. This causes the capturing system to be reset, the flash system to generate the flash of light, and the capturing system to capture the original image 620A. Next, the control system evaluates the color composition of the non-flash image and adjusts the original image to create the adjusted image 622A. Finally, the adjusted image is displayed on the image display 624A.

Figure 6B:
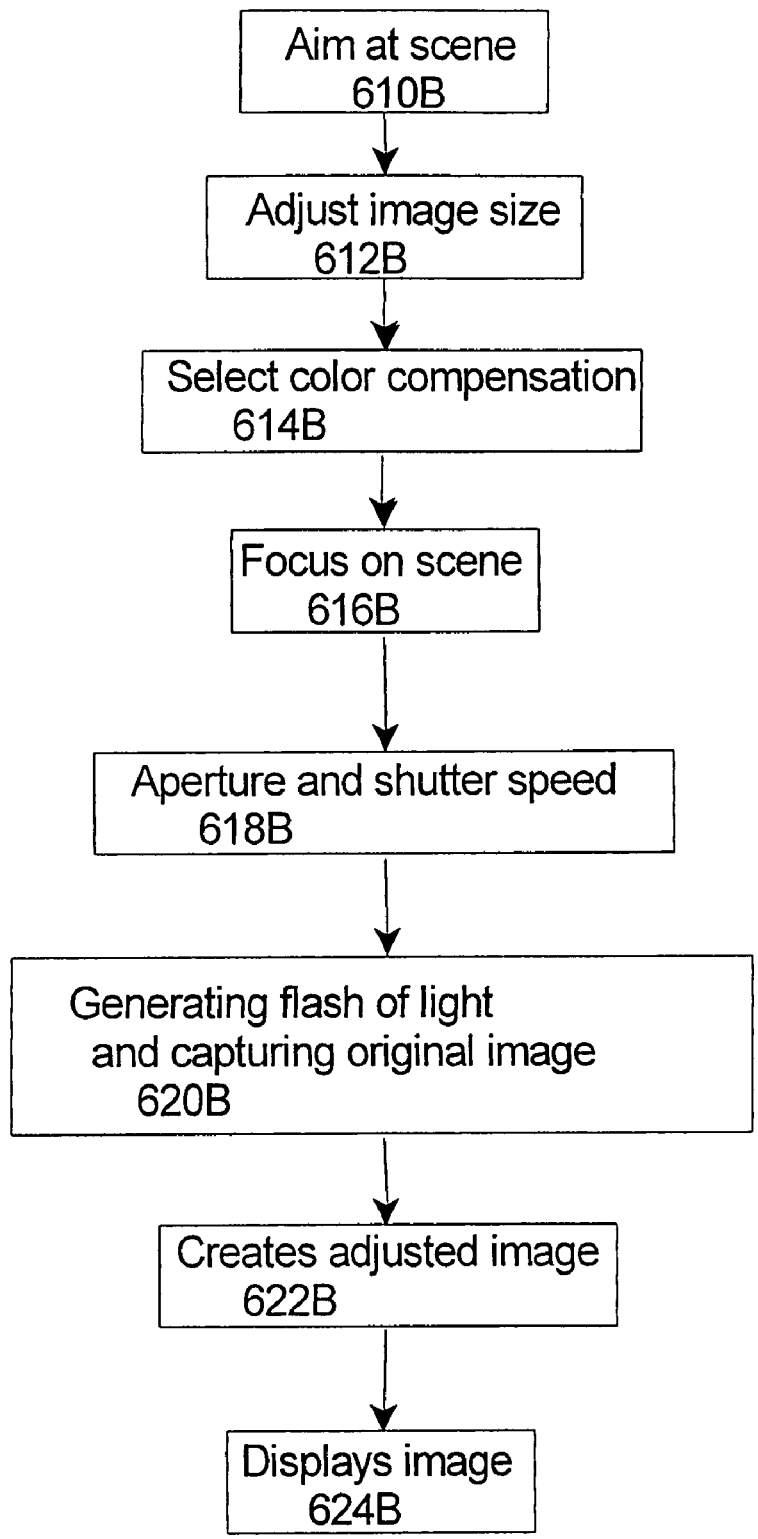
FIG. 6B is a simplified flowchart that illustrates another example of the operation of the image capturing apparatus.

FIG. 6B is a simplified flowchart that illustrates another non-exclusive example of the operation of the image capturing apparatus. First, the image capturing apparatus is aimed toward the scene 610B. Second, the user adjusts the zoom so as to adjust the size of the image as desired 612B. If the image apparatus is in the manual compensation mode, the user selects one of the selected color compensations 614B. Next, the user presses lightly on the shutter button to enable the image capturing apparatus to automatically focus on the object(s) and monitor the available light 616B. Subsequently, the image capturing apparatus sets the aperture and shutter speed 618B. Next, the user presses the shutter button all the way, which resets the capturing system, causes the flash system to generate the flash of light and causes the capturing system to capture the original image 620B. Next, the control system adjusts the original image in view of the selected color compensation to create the adjusted image 622B. Finally, the adjusted image is displayed on the image display 624B.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. An image capturing apparatus for providing an adjusted image of a scene having a scene color composition, the image capturing apparatus comprising:
   an apparatus frame;
   a flash system that generates a flash of light to illuminate the scene;
   a capturing system for capturing an original image when the scene is illuminated by the flash system and a non-flash image when the scene is not illuminated by the flash system, the original image having an original color composition, the non-flash image having a non-flash color composition that is different than the original color composition; and
   a control system that generates the adjusted image of the scene, the adjusted image being based on the original image that is adjusted in view of the non-flash image so that the adjusted image has an adjusted color composition that includes at least a portion of the non-flash color composition.

2. The image capturing apparatus of claim 1 wherein the control system is secured to the apparatus frame.

3. The image capturing apparatus of claim 1 wherein the scene is illuminated by light from a light source that contributes to the scene color composition, wherein the non-flash image captures the colors of light from the light source, and wherein the adjusted image is based on the original image that is adjusted to include the colors of light captured in the non-flash image.

4. The image capturing apparatus of claim 1 wherein adjusted image has an adjusted color composition that is significantly biased towards the non-flash color composition.

5. The image capturing apparatus of claim 1 further comprising a selector that can be selectively controlled by a user of the image capturing apparatus to selectively choose a selected color composition of the scene and wherein the adjusted image includes at least a portion of the selected color composition.

6. A method for generating an adjusted image of a scene having a scene color composition, the method comprising the steps of:
   providing an apparatus frame;
   generating a flash of light to illuminate the scene with a flash system;
   capturing an original image when the scene is illuminated by the flash system and a non-flash image when the scene is not illuminated by the flash system with a capturing system, the original image having an original color composition, the non-flash image having a non-flash color composition that is different than the original color composition; and
   generating the adjusted image of the scene with a control system, the adjusted image being based on the original image that is adjusted in view of the non-flash image so that the adjusted image has an adjusted color composition that includes at least a portion of the non-flash color composition.

7. The method of claim 6 further comprising the step of securing the control system to the apparatus frame.

8. The method of claim 6 wherein the scene is illuminated by light from a light source that contributes to the scene color composition, wherein the non-flash image captures the colors of light from the light source, and wherein the step of generating the adjusted image includes the step of adjusting the original image to include the colors of light captured in the non-flash image.

9. The image capturing apparatus of claim 1 wherein the control system adjusts a tonal value of at least one of red, green and blue in the original image to mimic a tonal value of at least one of red, green and blue in the non-flash image.

10. The method of claim 6 wherein the step of generating the adjusted image includes adjusting the original image in view of the non-flash image so that the adjusted image has an adjusted color composition that is significantly biased towards the non-flash color composition.

11. The method of claim 6 further comprising the step of selectively choosing a selected color composition of the scene with a selector, wherein the step of generating the adjusted image includes the step of adjusting the original image to include at least a portion of the selected color composition.

12. The method of claim 6 the step of adjusting the original image includes adjusting a tonal value of at least one of red, green and blue in the original image to mimic a tonal value of at least one of red, green and blue in the non-flash image.

* * * * *

UNITED STATES PATENT AND TRADEMARK OFFICE
CERTIFICATE OF CORRECTION

PATENT NO.       : 7,623,780 B2                      Page 1 of 1
APPLICATION NO.  : 11/378872
DATED            : November 24, 2009
INVENTOR(S)      : Mark Takita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-sixth Day of October, 2010

David J. Kappos
*Director of the United States Patent and Trademark Office*